(12) United States Patent
Uyeki

(10) Patent No.: US 12,668,149 B2
(45) Date of Patent: Jun. 30, 2026

(54) RENEWABLE ENERGY CREDIT MANAGEMENT SYSTEM AND METHOD FOR USE WITH ELECTRIC VEHICLES

(71) Applicant: Honda Motor Co., Ltd., Tokyo (JP)

(72) Inventor: Robert M. Uyeki, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 185 days.

(21) Appl. No.: 18/498,685

(22) Filed: Oct. 31, 2023

(65) Prior Publication Data

US 2024/0059175 A1     Feb. 22, 2024

Related U.S. Application Data

(63) Continuation of application No. 17/533,257, filed on Nov. 23, 2021, now Pat. No. 11,897,358.

(51) Int. Cl.
| | |
|---|---|
| *G06Q 40/00* | (2023.01) |
| *B60L 50/60* | (2019.01) |
| *B60L 53/66* | (2019.01) |
| *B60L 55/00* | (2019.01) |
| *G06Q 20/06* | (2012.01) |

(Continued)

(52) U.S. Cl.
CPC ............. *B60L 53/665* (2019.02); *B60L 50/60* (2019.02); *B60L 55/00* (2019.02); *G06Q 20/06* (2013.01); *G06Q 20/208* (2013.01); *G06Q 30/018* (2013.01); *G06Q 50/06* (2013.01)

(58) Field of Classification Search
CPC ........ B60L 53/665; B60L 50/60; B60L 55/00; B60L 53/51; B60L 53/52; B60L 53/63;

B60L 53/64; B60L 53/65; B60L 53/67; B60L 53/68; G06Q 20/06; G06Q 20/208; G06Q 30/018; G06Q 50/06; G06Q 20/145;

(Continued)

(56) References Cited

U.S. PATENT DOCUMENTS

| | | |
|---|---|---|
| 6,978,931 B2 | 12/2005 | Brobeck |
| 7,928,693 B2 | 4/2011 | Hafner et al. |

(Continued)

FOREIGN PATENT DOCUMENTS

| | | |
|---|---|---|
| EP | 2396761 A1 | 12/2011 |

OTHER PUBLICATIONS

Demand request dispatch approach for electric distribution systems; 2013 IEEE Electrical Power & Energy Conference (2013, pp. 1-8); Luke Seewald, Vinay Sharma; Aug. 21, 2013 . . . (Year: 2013).*

(Continued)

*Primary Examiner* — Tien C Nguyen
(74) *Attorney, Agent, or Firm* — Plumsea Law Group, LLC

(57)     ABSTRACT

Systems and methods for tracking and managing the transfer of renewable energy and credits associated with the renewable energy are disclosed, particularly in the context of a V2G framework. A server may receive information about an electric vehicle's charging and discharging states. When the electric vehicle is known to have obtained a charge from a renewable source, the transfer of any energy associated with that charge to a recipient may also trigger the transfer of renewable energy credits (RECs) to the recipient. The server maintains an accounting of the movement of RECs, and may also facilitate compensation to electric vehicle owners for their return of clean energy to a third party.

20 Claims, 4 Drawing Sheets

(51) Int. Cl.
  *G06Q 20/20*     (2012.01)
  *G06Q 30/018*    (2023.01)
  *G06Q 50/06*     (2012.01)

(58) Field of Classification Search
  CPC ...... G06Q 30/06; G06Q 40/04; G07F 15/005;
        G07F 15/008; H02J 3/008; H02J 3/322
  See application file for complete search history.

(56)           References Cited

U.S. PATENT DOCUMENTS

| | | | |
|---|---|---|---|
| 8,319,358 B2 | 11/2012 | Curry et al. | |
| 9,987,940 B2 | 6/2018 | Uyeki | |
| 10,011,183 B2 | 7/2018 | Shimizu et al. | |
| 10,464,434 B2 | 11/2019 | Homma et al. | |
| 10,906,423 B2 | 2/2021 | Bridges et al. | |
| 11,731,524 B2 * | 8/2023 | Martin | G01R 31/382 |
| | | | 320/109 |
| 2002/0132144 A1 * | 9/2002 | McArthur | B60L 15/2045 |
| | | | 429/513 |
| 2009/0259547 A1 * | 10/2009 | Clopp | G06Q 30/02 |
| | | | 705/14.16 |
| 2009/0276305 A1 * | 11/2009 | Clopp | G06Q 30/0214 |
| | | | 705/14.16 |
| 2009/0313103 A1 * | 12/2009 | Ambrosio | B60L 53/64 |
| | | | 705/14.34 |
| 2010/0082464 A1 | 4/2010 | Keefe | |
| 2010/0235008 A1 * | 9/2010 | Forbes, Jr. | G06Q 10/00 |
| | | | 700/297 |
| 2011/0184585 A1 * | 7/2011 | Matsuda | H04L 63/12 |
| | | | 700/297 |
| 2011/0202418 A1 * | 8/2011 | Kempton | B60L 53/63 |
| | | | 705/26.1 |
| 2011/0241824 A1 * | 10/2011 | Uesugi | H02J 7/0047 |
| | | | 320/109 |
| 2012/0245750 A1 * | 9/2012 | Paul | H02J 3/003 |
| | | | 700/291 |
| 2012/0303397 A1 * | 11/2012 | Prosser | B60L 53/18 |
| | | | 705/7.12 |
| 2013/0241485 A1 | 9/2013 | Snyder | |
| 2014/0125279 A1 * | 5/2014 | Juhasz | H02J 7/00 |
| | | | 320/109 |
| 2014/0222698 A1 * | 8/2014 | Potdar | G06Q 30/018 |
| | | | 705/317 |
| 2014/0316958 A1 * | 10/2014 | Alberth, Jr. | G06Q 10/00 |
| | | | 705/35 |
| 2016/0063456 A1 * | 3/2016 | Droege | H02J 3/003 |
| | | | 705/23 |
| 2016/0350778 A1 * | 12/2016 | Levine | G06Q 40/04 |
| 2017/0259683 A1 * | 9/2017 | Shimizu | B60L 53/63 |
| 2018/0052505 A1 * | 2/2018 | Cruickshank, III | H02J 3/00 |
| 2018/0241255 A1 * | 8/2018 | Leabman | H04B 1/04 |
| 2019/0139162 A1 * | 5/2019 | Sawada | B60L 53/60 |
| 2019/0160958 A1 * | 5/2019 | Chaudhary | B60L 53/665 |
| 2019/0351783 A1 * | 11/2019 | Goei | B60L 53/665 |
| 2019/0389327 A1 * | 12/2019 | Matsuda | H02J 7/92 |
| 2020/0101863 A1 * | 4/2020 | Westin | B60L 53/51 |
| 2020/0262307 A1 * | 8/2020 | Rosene | H04L 67/52 |
| 2020/0276910 A1 | 9/2020 | Harty et al. | |
| 2020/0317084 A1 * | 10/2020 | Schaffer | B60L 53/305 |
| 2021/0001744 A1 | 1/2021 | Suzuki | |
| 2022/0343344 A1 * | 10/2022 | Roy | G06Q 50/06 |

OTHER PUBLICATIONS

Network Security and Privacy Challenges in Smart Vehicle-to-Grid
Neetesh Saxena, Santiago Grijalva, Victor Chukwuka, and Athanasios
V. Vasilako (Year: 2017).
A Survey of Blockchain Applications in the Energy Sector Pub-
lished in: IEEE Systems Journal (vol. 15, Issue: 3, pp. 3370-3381)
Authors: Jiabin Bao • Debiao He • Min Luo • Kim-Kwang Raymond
Choo (Year: 2020).

* cited by examiner

RENEWABLE ENERGY CREDIT MANAGEMENT SYSTEM AND METHOD FOR USE WITH ELECTRIC VEHICLES

CROSS-REFERENCE TO RELATED APPLICATION

This application claims the benefit of co-pending U.S. Pat. No. 17,533,257 filed on Nov. 23, 2021, to Robert M. Uyeki and titled "Renewable Energy Credit Management System and Method for Use With Electric Vehicles, the disclosure of which is incorporated by reference herein in its entirety.

BACKGROUND

While still small in both absolute size and market share, the electric vehicle (EV) market is one of the most rapidly changing and fastest growing high-tech sectors in the global economy. According to some estimates, sales of electric vehicles could account for one-fifth of new car sales globally by 2025; more bullish projections see EVs taking 50% of sales or more by 2030. The implications for electric utilities, customers, service providers, and vehicle owners are far-reaching and rapidly evolving.

Today's fast-changing EV-charging market represents the beginnings of a demand-side opportunity: intelligent, inter-active electricity demand that is movable in time and space. A car with a 30 kWh battery stores as much electricity as the average U.S. residence consumes in a day. Even without vehicle-to-grid (V2G) power flows, the ability to flexibly manage charging while still meeting customer requirements may provide a new kind of distributed resource at the grid edge. Considered as a pooled resource, the growing number of electric vehicle batteries may provide a wide range of valuable grid services, from demand response and voltage regulation to distribution-level services, without compro-mising driving experience or capability. Electric utility com-panies may use new communications and control technolo-gies, together with innovative tariffs and incentive structures, to tap the sizeable value potential of smart electric-vehicle charging to benefit utility customers, share-holders, vehicle owners, and society at large. This will mean influencing, with increasing precision, where and when EVs are charged through a combination of partnerships, incen-tives, and market structures. In its early stages, the interest-ing challenges and opportunities related to vehicle grid integration will be local or even hyper-local, at the scales where grid related issues will first emerge. For example, as vehicles begin to return power to the grid, any RECs (renewable energy credits) associated with that power may be lost due to a transaction gap or a collaboration gap between energy authorities and the other authorities, dis-couraging use of the REC incentive program.

Therefore, there is a need for a system that may facilitate coordination between multiple parties to effectively manage the RECs and address the shortcomings described above.

SUMMARY

The disclosed embodiments provide methods and systems for automatic tracking and management of renewable energy credits provided by electric vehicles serving as distributed energy resources.

In one aspect, a method of managing the transfer of renewable energy credits (RECs) is disclosed. The method may include receiving, at a server, first electric discharging information for a first electric vehicle indicating that the first electric vehicle has, at a first time, discharged a first amount of renewable energy to a recipient via a first energy transfer station. In addition, the method may include transmitting, from the server, data about the first electric discharging information to an electronic device associated with an energy regulatory authority. The method may also include receiving, at the server, first credit information from the electronic device, the first credit information calculated based on the first amount that was discharged, and trans-mitting, from the server, the first credit information (to a computing device) for the recipient.

In another aspect, a method of tracking a first amount of renewable energy is disclosed. The method may include receiving, at a server, first registration information for a first electric vehicle and generating a first account based on the first registration information. In addition, the method may include receiving, at the server, second registration infor-mation for a first consumer and generating a second account based on the second registration information. The method may also include receiving, at the server, first electric discharging information for the first electric vehicle indicat-ing that the first electric vehicle has, at a first time, dis-charged a first amount of renewable energy to the first consumer, and determining, at the server, the first amount of renewable energy corresponds to a first number of RECs. The method may include transferring, from the first account to the second account, a first number of RECs.

In another aspect, a system for managing the transfer of RECs includes a processor and machine-readable media including instructions which, when executed by the proces-sor, cause the processor to receive, at a server, first electric discharging information for a first electric vehicle indicating that the first electric vehicle has, at a first time, discharged a first amount of renewable energy to a recipient via a first energy transfer station, and to transmit, from the server, data about the first electric discharging information to an elec-tronic device associated with an energy regulatory authority. The instructions further cause the processor to receive, at the server, first credit information from the electronic device, the first credit information calculated based on the first amount that was discharged, and to transmit, from the server, the first credit information to the recipient.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the follow-ing claims.

BRIEF DESCRIPTION OF THE DRAWINGS

The embodiments may be better understood with refer-ence to the following drawings and description. The com-ponents in the figures are not necessarily to scale, emphasis instead being placed upon illustrating the principles of the embodiments. Moreover, in the figures, like reference numerals designate corresponding parts throughout the dif-ferent views.

DETAILED DESCRIPTION

Figure 1:
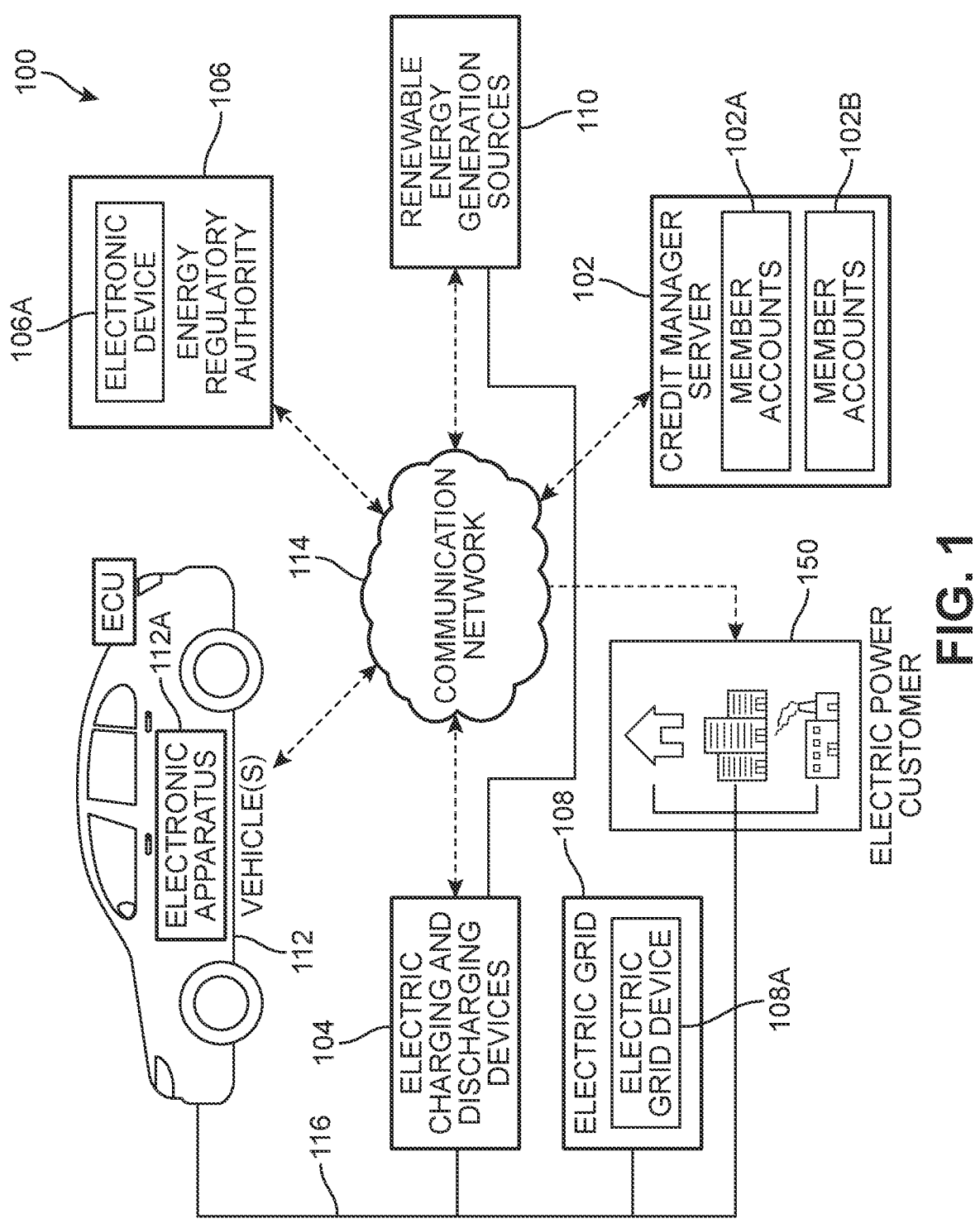
FIG. 1 presents a schematic diagram that illustrates a network environment for credit management by a server, in accordance with an embodiment of the disclosure.

A renewable energy certificate, also known as a renewable energy credit (REC) is a tradeable, market-based instrument that represents the legal property rights to the "renewableness"—or all non-power attributes—of renewable electricity generation. A REC may be sold separately from the actual electricity (kilowatt-hour, or kWh). The REC owner has exclusive rights to make claims about "using" or "being powered with" the renewable electricity associated with that REC. A REC may be issued for every megawatt-hour (MWh) of electricity generated and delivered to the electric grid from a renewable energy resource. If a person owns RECs associated with a renewable energy source electricity output, these RECs may be sold to another party. In doing so, the owner forfeits the ability to make any claims about their use of that renewable energy, but instead generates a new revenue stream. The revenue is typically a function of the system's kWh output and the market price of RECs.

For those who purchase RECs, there is value in having certified proof that they are using renewable energy from the grid, without having to actually install solar panels or other renewable energy systems at their home or business. This flexibility may allow participants to reduce their carbon footprint. Purchasing RECs also supports the renewable energy market by providing a demand signal to the market, which in turns encourages more supply of renewable energy. In this way, RECs not only help businesses meet their greenhouse gas emission goals—they also encourage the generation of more renewable energy.

By virtue of being a flexible load, electric vehicles (EVs) may be used both to absorb renewable energy that might otherwise be curtailed during periods of high output and low demand, and to respond to real-time fluctuations in renewable output and system ramping needs, thus reducing the need for flexible gas generation. Similarly, adding EV capacity to the grid may absorb excess production from wind and convert it to a dispatchable resource. As the EV market grows, grid technology evolves, and renewables capture a greater share of the electricity generation market, it will be critical for utilities and regulators to understand the future demand of EVs in an integrated way and implement the best practices for managing EV load growth—as well as providing appropriate incentivization for EV owners in order to encourage individual participation.

As a general matter, V2G technology involves drawing unused power from the car into the smart grid. V2G, which is also known as vehicle-grid integration (VGI), may help the energy grid supply electricity during peak hours. For purposes of this application, the term "V2X" refers to a broad, encompassing term for vehicle-to-"everything". Thus, V2X includes different use cases such as vehicle-to-home (V2H), vehicle-to-building (V2B), and vehicle-to-grid (V2G) services. In other words, an EV owner may use electricity from their EV battery to power their home or building electrical loads, as well as simply feeding back to the grid. In cases where the EV battery charge was obtained from a clean energy source, V2X would also help mitigate climate change by allowing our energy system to balance more and more renewable energy. The embodiments described herein should be understood to encompass the various types of V2X.

The V2X approach thus provides an extra power source when weather-dependent renewable energy sources are not available. In addition, if the EV was charged through a renewable energy source, the power provided to the home (or other recipient) is clean. For example, a home that uses solar power cannot generate electricity at night, but an electric vehicle that had charged using solar power earlier could provide a secondary source of power at night if needed.

Advantageously, the system and method described herein promotes engagement by the EV owners. While enabling their car batteries to be used for V2X does no harm EV owners may not be attracted to this arrangement. In order for this approach to be realized in the future on a larger scale, EV drivers should be rewarded for their willingness to enable their car batteries to be used as balancing elements. If the EV owner were paid for their energy contribution, this would potentially lower the cost of electric vehicle ownership. An owner may sell back surplus power from their vehicle in order to offset other costs.

However, while it might be expected that the EV driver would be compensated for the actual electricity (kWh) they provide to another entity from the EV during a V2X event, the source of the energy should also be taken into account. In other words, in cases where the kWh is sourced from renewable energy, there should be further compensation. A value-based compensation policy for these vehicular distributed energy resources is needed that accounts for (a) the energy transferred and (b) whether that energy was from a renewable source. To encourage EV owners to charge their vehicles using sustainable energy and then transfer such energy to another party, the electricity and renewable energy credits associated with that electricity may be viewed as dual compensation paths. Thus, if renewable energy is transferred from a vehicle to a recipient (e.g., home, building, grid, etc.) the fact that it was from a renewable source is information that should also be transferred, both for the benefit of the recipient's clean energy goals, and to facilitate financial 'clean energy' bonuses to the vehicle owner.

As will be described herein, in cases where an EV owner may certify that their vehicle's current charge state was provided through renewable energy (e.g., solar panels on the vehicle's exterior, certified solar power, etc.), or that renewable energy credits were purchased and/or allocated to the vehicle's owner when the vehicle was charged, the transfer of this clean energy should also transfer those credits and/or other information certifying the transferred power as clean. In cases where the energy is not certified clean, the EV owner would simply be compensated for the value of the energy transferred. However, in cases where the energy is clean, the vehicle owner would be compensated not only for the value of the energy that was transferred, but for its clean attributes. To this end, the proposed embodiments describe a system and method for managing and accounting of clean energy as it moves between a vehicle and the grid or other energy recipient (home, business, etc.).

For purposes of introduction to the proposed transactional-based system for clean energy credit management, FIG. 1 depicts a block diagram that illustrates an exemplary network environment for renewable energy credit management by a server 102, in accordance with an embodiment of the disclosure. There is shown a network environment 100 which includes a server 102. The server 102 may be communicatively coupled with a plurality of electric charging and/or discharging devices ("energy transfer devices", or more simply "transfer devices") 104, an energy regulatory authority 106, an electric grid device 108A associated with an electric grid 108, a renewable energy generation source(s) ("renewable energy generator(s)) 110, electric power consumer(s) ("consumer(s)") 150 and vehicle(s) 112, through a communication network 114.

In different embodiments, the vehicle(s) 112 may include an electronic apparatus 112A, as well as a wireless communication module and an electronic control unit (ECU) 112B. The energy transfer devices 104 may include a first electric charging and/or discharging facility device, a second electric charging and/or discharging facility device, and a Nth electric charging and/or discharging facility device for charging the vehicle(s) 112. The energy regulatory authority 106 may include an electronic device 106A that may be configured to monitor a charging activity (such as charging the vehicle(s) 112) of the energy transfer devices 104 and issue a credit (such as REC/carbon offset or other renewable energy-related credit) based on the charging activity, for example to a vehicle, or a carbon generation entity seeking carbon credits. The renewable energy generator 110 may include a communication device 110A that may be configured to perform transactions associated with its clean energy output. Modifications, additions, or omissions may be made to FIG. 1 without departing from the scope of the present disclosure. For example, the network environment 100 may include more or fewer elements than those illustrated and described in the present disclosure. For instance, in some embodiments, the network environment 100 may only include one of the consumer(s) 150 and grid 108, without deviation from the scope of the disclosure.

In different embodiments, the server 102 may include suitable logic, circuitry, interfaces, and/or code that may be configured store registration information associated with the energy transfer devices 104. The server 102 may further be configured to handle a collaboration between the energy transfer devices 104, the energy regulatory authority 106, the electric grid device 108A associated with the electric grid 108, the renewable energy generator 110, and the vehicle(s) 112, for the credit management. The credit management may primarily include, but is not limited to, renewable energy credit information (such as a carbon offsets) management, and monetary credit information management. In the REC information management, the server 102 may be configured to collaborate between the energy transfer devices 104, vehicle(s) 112, consumer(s) 150, renewable energy generator(s) 110, and/or the energy regulatory authority 106. In the monetary credit information management, the server 102 may be configured to collaborate between the energy transfer devices 104, users of the vehicle(s) 112, electric grid 108 and/or consumer(s) 150.

In some embodiments, the server 102 may be implemented as a cloud server, which may be utilized to execute various operations through web applications, cloud applications, HTTP requests, repository operations, file transfer, and the like. Examples of the server 102 may include, but are not limited to, an event server, a database server, a file server, a web server, a media server, a content server, an application server, a mainframe server, or a combination thereof. In one or more embodiments, the server 102 may be implemented as a distributed cloud-based resources. In some embodiments, the server 102 may be a handheld or a portable device. In such case, the examples of the server 102 may include, but are not limited to, a computing device, a mainframe machine, a computer workstation, a smartphone, a cellular phone, a mobile phone, and/or any electronic device with data processing and networking capabilities.

In different embodiments, the server 102 includes or has access to member accounts 102a and/or an electronic payments system 102b. Member accounts 102a may be configured as a data repository for enrollment and management of renewable energy providers and recipients that have elected to participate in the credit tracking program enabled by server 102. In addition, the server 102 may be configured to automatically initiate or perform payment transfers from a recipient to a provider (i.e., electric vehicle owner) in response to verifying the transfer has occurred. In one embodiment, the electronic payments system 102b may serve as an electronic commerce technology, which may be similar to or incorporate the features of financial services such as but not limited to PayPal®, Venmo®, CashApp®, Google Pay®, Apple Pay®, Square®, etc. Thus, in some cases, a recipient-member may opt to have the server 102 automatically debit their account when a transfer of renewable energy occurs, and a provider-member may opt to have the server 102 automatically credit a payment to their account when the transfer of renewable energy occurs.

The energy transfer devices 104 may include suitable logic, circuitry, interfaces and/or code that may be configured to transfer electric energy between the vehicle(s) 112 and the electric grid device 108A associated with the electric grid 108 and/or electric power consumer(s) 150. The energy transfer devices 104 may include one electric charging and/or discharging facility device or more than one energy transfer devices to transfer electric energy between the vehicle(s) 112 and the electric grid device 108A and/or electric power consumer(s) 150 associated with the electric grid 108, without deviation from the scope of the disclosure. The energy transfer devices 104 may be configured to control, process, and monitor the electric energy transferred between each of the vehicle(s) 112 and the electric power consumer(s) 150 and/or electric grid device 108A associated with the electric grid 108. In some embodiments, the energy transfer devices 104 and/or local batteries linked to electric power consumer(s) 150 may store the electric energy received either from the electric grid device 108A associated with the electric grid 108 or from the vehicle(s) 112, and further transfer the electrical charge to vehicle(s) 112, to the electric grid 108, and/or other electric power consumer(s) 150.

One of the energy transfer devices 104 may transfer the electric energy to the vehicle(s) 112, via an electrical transmission line 116 (i.e., charging cable, a wireless charging link, or the like, represented in FIG. 1 by a dashed line). Examples of the energy transfer devices 104 may include, but are not limited to an electric vehicle (EV) charging station, an electric recharging point, an electronic charging station, an electric vehicle supply equipment (EVSE), a Direct Current (DC) fast charging station, a home electric charging station, a domestic electrical socket, a Level 1 charging station, a Level 2 charging station, or a Level 3 charging station, or other V2G mechanisms.

The energy regulatory authority 106 may include suitable logic, circuitry, interfaces and/or code that may be configured to reduce carbon footprints by issuing a tradable certificate (such as the REC information) to a particular entity which performs or support sustainable development activities. The entity may refer to (such as the renewable energy generators 110 or even carbon generators that purchase clean energy. The sustainable development activities may include, but not limited to, usage of renewable energy sources (such as wind, solar, etc.), usage of electric vehicles (such as the vehicle(s) 112) compared to fossil fuel based vehicles that generates carbon emissions, or include even planting of trees to absorb and reduce carbon content from the environment.

The energy regulatory authority 106 may also issue the tradable certificate to the entity that adopts innovative solutions to reduce greenhouse gas emissions during production and transportation. The energy regulatory authority 106 may include the electronic device 106A. The electronic device 106A may include suitable logic, circuitry, interfaces and/or code that may be configured to receive information related to the sustainable development activities and to issue the tradable certificate based on the sustainable development activity. For example, the electronic device 106A may be configured to receive the electric charging information from each of the energy transfer devices 104, and further transmit first credit information (for example RECs or tradable certificate) to the energy transfer devices 104. Examples of the energy regulatory authority 106 may include, but not limited to, National Clean Development Mechanism Authority (NCDMA), or Air Resources Board (ARB), Verified Carbon Standard (VCS) authority, or the like. Examples of the electronic device 106A associated with the energy regulatory authority 106 may include, but are not limited to, a computing device, a mainframe machine, a computer work-station, a smartphone, a cellular phone, a mobile phone, and/or any electronic device with data processing and net-working capabilities.

The electric grid device 108A may include suitable logic, circuitry, interfaces and/or code that may be configured to manage and transfer electric charge to consumer(s) 150 and/or vehicle(s) 112 (e.g., via the energy transfer devices 104) from the electric grid 108. The electric grid 108 may be a managed network of high voltage (HV) power transmission lines, sub-stations, low voltage (LV) distribution lines, and generation facilities (such as power plants). The electric grid 108 may be configured to deliver electric energy to the vehicle(s) 112 and/or consumer(s) 150 through the energy transfer devices 104. The electric grid 108 may be configured to deliver the electric energy to the energy transfer devices 104 through various transmission and distribution lines. Example of the electric grid 108 may include, but are not limited to, a micro-grid, a national grid, a smart grid, and other electric energy generation facilities. In an embodiment, the electric grid device 108A may be configured to communicate data or information (for example, related to a renewable energy certificate (REC)) to the energy transfer devices 104 for the purchase of the electric charge from the electric grid 108. The electric grid device 108A may be a communication device or an electronic device associated with the electric grid 108. Examples of the electric grid device 108A may include, but are not limited to, a computing device, a mainframe machine, a computer work-station, a smartphone, a cellular phone, a mobile phone, and/or any electronic device with data processing and networking capabilities.

The renewable energy generator 110 may be an entity who may be responsible for producing clean energy. For purposes of this application, references to "clean", "renewable", and "sustainable" energy are understood to be interchangeable and encompass all types of energy that do not produce (or limit) greenhouse gas emissions and/or carbon footprints in the environment. The renewable energy generator 110 may perform sustainable activities. The renewable energy generator 110 may include the communication device 110A to communicate with the server 102 (i.e., through the communication network 114) to sell the REC information. In the network environment 100, there is shown only one renewable energy generator 110. However, one skilled in the art may understand that the renewable energy generator 110 shown in FIG. 1 is merely an example and there may be more such renewable energy providers, without any deviation from the scope of the disclosure. In some embodiments, this energy may also be directly produced by vehicle(s) 112 that incorporate renewable energy technology such as solar or wind energy capture components. Description of such renewable energy providers are omitted from the disclosure for the sake of brevity. Examples of the renewable energy generator 110 may include, but are not limited to, entities generating energy from biomass, geothermal, hydroelectric, solar, ocean, hydrogen, and wind power, and the like.

In contrast, carbon generation entities (not shown in FIG. 1) are responsible for generating harmful carbon emissions in the environment, and are typical customers of RECs. Their non-sustainable activities may include, but not limited to, petroleum oil production, fossil fuel usage in industrial production, fossil fuel usage in transportation, and the like. In order to indulge in such non-sustainable activities, the carbon generation entity may be required to purchase the RECs or the tradable certificate from the other entities (such as the renewable energy generator 110) who perform the sustainable activities. Once the REC information is purchased, the carbon generator may be authorized to continue their non-sustainable activities, in accordance with offsetting amount of the purchased REC information.

The vehicle(s) 112 may include suitable logic, circuitry, and/or interfaces, which may be configured to receive the electric charge and use such electric charge for the transportation of the vehicle(s) 112 or to run different electronic or electrical components/devices of the vehicle(s) 112. To receive the electric charge, the vehicle(s) 112 may communicate with at least one of the energy transfer devices 104 directly via the electrical transmission line 116. In the case of hybrid vehicles, the vehicle may receive electric charge from the rotating wheels which transfer energy back to the battery pack. The vehicle(s) 112 may include a battery (not shown) to store the electric charge received from the one of the energy transfer devices 104.

The vehicle(s) 112 may be a non-autonomous, a semiautonomous, or an autonomous vehicle. Examples of the vehicle(s) 112 may include, but are not limited to, an electric vehicle, a hybrid vehicle, and/or a vehicle that uses a combination of one or more distinct renewable and non-renewable power sources. Thus, the term EV is used inclusively to refer to plug-in electric vehicles that are variously referred to in the literature as plug-in hybrid electric vehicles (PHEVs), extended range electric vehicles (EREVs), all-electric vehicles (AEVs), battery electric vehicles (BEVs), and plug-in electric vehicles (PEVs), and other hybrid vehicles. In different embodiments, the vehicle(s) 112 that uses renewable and non-renewable power sources may include a fossil fuel-based vehicle, an electric propulsion-based vehicle, a hydrogen fuel-based vehicle, a solar-powered vehicle, and/or a vehicle powered by other forms of alternative energy sources. The vehicle(s) 112 may further include the electronic apparatus 112A that may be configured to communicate with the server 102 over the communication network 114. In an embodiment, there may be one or multiple vehicles which may be electrically charged by one or more of the energy transfer devices 104, without any deviation from the scope of the disclosure.

The electronic apparatus 112A associated with the vehicle(s) 112 may include suitable logic, circuitry, interfaces, and/or code that may be configured to communicate with the server 102 on behalf of the vehicle(s) 112 over the communication network 114. For example, the electronic apparatus 112A may send a request to one of the energy transfer devices 104 to receive the electric charge. In an embodiment, the electronic apparatus 112A may receive charging recommendation information from the server 102. The electronic apparatus 112A may be an in-vehicle infotainment system that may be integrated with the vehicle(s) 112. The in-vehicle infotainment system may include suitable logic, circuitry, interfaces and/or code that may be configured to render at least an audio-based data, a video-based data, and/or a user interface to an occupant (not shown) of the vehicle(s) 112. The in-vehicle infotainment system may be configured to execute one or more operations associated with the vehicle 112. Examples of the in-vehicle infotainment system may include, but are not limited, an entertainment system, a navigation system, a vehicle user interface (UI) system, an Internet-enabled communication system, and other entertainment systems. In some embodiments, the electronic apparatus 112A may be the electronic control unit (ECU) 112B of the vehicle(s) 112 or an electronic dashboard of the vehicle(s) 112. In other embodiments, the electronic apparatus 112A may be a portable device that may be associated with the occupant of the vehicle(s) 112. Examples of the portable device may include, but are not limited to, a computing device, a smartphone, a cellular phone, a mobile phone, a gaming device, a camera device, a computer work-station, a personal digital assistant (PDA) and/or a consumer electronic (CE) device.

The communication network 114 may include a communication medium through which the server 102, the energy transfer devices 104, the electronic device 106A of the energy regulatory authority 106, the electric grid device 108A of the electric grid 108, the consumer(s) 150, the communication device 110A of the renewable energy generator 110, and the electronic apparatus 112A associated with the vehicle(s) 112 may communicate with each other. The communication network 114 may be one of a wired connection or a wireless connection. Examples of the communication network 114 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 114 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the server 102 (for example an aggregator) may store registration information associated with the energy transfer devices 104. The registration information may be identification information (for example a unique identifier, a location) associated with each of the energy transfer devices 104. The energy transfer devices 104, may be registered with the server 102 based on the stored registration information. The server 102 may be configured to receive electric charging information (such as vehicle charging data, a renewable energy certificate, etc.) recorded for a period of time (for example, certain hours, certain days, certain weeks, certain months, or more). The electric charging information may be received from each of the energy transfer devices 104 and/or consumer(s) 150. For example, when the vehicle(s) 112 is electrically charged from the first electric charging and/or discharging facility device 104A of the energy transfer devices 104, the electric charging information of the vehicle(s) 112 may be stored in a memory (not shown) of the first electric charging and/or discharging facility device 104A. The electric charging information may indicate an amount of electric charge provided by the first electric charging and/or discharging facility device 104A to the vehicle(s) 112 or to other entities over the period of time (for example in last one week or in a particular month). Similarly, the electric charging information may indicate an amount of electric charge provided by the electric vehicle to the first electric charging and/or discharging facility device 104A over the period of time (for example in last one week or in a particular month). The server 102 may receive the electric charging information from each of the energy transfer devices 104 and/or directly from the vehicle's electronic apparatus 112A.

The server 102 may further transmit, through the communication network 114, the received electric charging information to the electronic device 106A associated with the energy regulatory authority 106. The electronic device 106A of the energy regulatory authority 106 may validate an authenticity of the received electric charging information (or of the corresponding electric charging and/or discharging facility device), and may generate the first credit information (which may be the tradable certificate, or the RECs). The first credit information may be calculated based on the received electric charging information. The server 102 may be further configured to receive the first credit information from the electronic device 106A, based on the transmitted electric charging information.

The server 102 may further transmit, through the communication network 114, the received first credit information to each of the energy transfer devices 104 or the first electric charging and/or discharging facility device 104A from which the electric charging information may be received. The energy transfer devices 104 may be configured to store the first credit information that may be transmitted from the server 102. Each of the energy transfer devices 104 may utilize the received first credit information for monetization purposes, such as monetary transactions, based on selling a partial or complete first credit information to other entities (such as consumer(s) 150). As an additional advantage, the energy transfer devices 104 may even utilize the first credit information (i.e., RECs) to offset their own carbon footprint, which may have generated through the non-sustainable activities (such as a fossil fuel consumption for production and transportation of electric charge).

The server 102 may further receive, through the communication network 114, a request (such as the carbon credit/offset request) from a communication device associated with a carbon generator or other consumer 150. The server 102 may further transmit the received request from the communication devices to each of the energy transfer devices 104 through the communication network 114. The received request may relate to the carbon offset that may be required for the vehicle 112 and/or consumer 150 to indulge in non-sustainable activities (such as petroleum oil production, fossil fuel usage in industrial production, fossil fuel usage in transportation), or in response to a desire of the vehicle 112 and/or consumer 150 to support sustainable activities.

Figure 2:
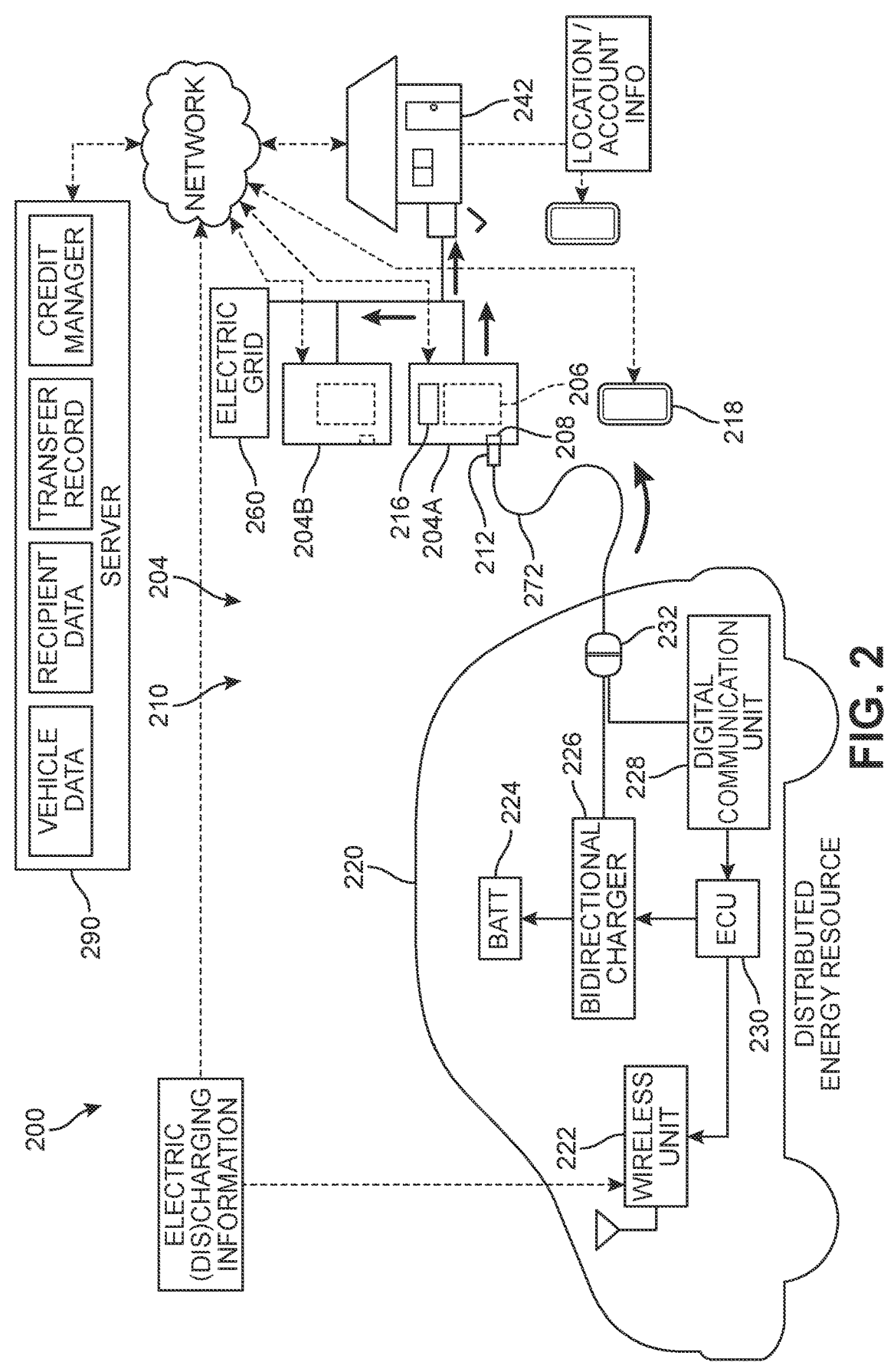
FIG. 2 is a schematic diagram illustrating the transfer of clean energy from an electric vehicle to an energy transfer station, in accordance with an embodiment of the disclosure.

Referring now to FIG. 2, additional details regarding embodiments of the system and method are discussed. A framework 200 of an embodiment of the EV discharging-credit system is presented in FIG. 2. As noted earlier, a V2G system 210 is a system for exchanging power between energy transfer devices 204 (e.g., connected to a commercial power grid or other facility) and multiple electric vehicle(s) 220 (only one electric vehicle is shown in FIG. 2), and when the electric vehicle 220 is not used as a means of transportation, a battery 224 mounted on the electric vehicle 220 is used as a power storage facility. Therefore, bidirectional power exchange is allowed between the battery 224 of the electric vehicle 220 participating in V2G and the power system 250.

In FIG. 2, the energy transfer devices 104 include a first transfer station 204a and a second transfer station 204b. In different embodiments, the transfer stations may be connected to electric grid 260 (see FIG. 1). Electricity may enter the grid from many different sources, ranging from wind power and solar to natural gas and nuclear power. There is typically no way to know exactly which energy source generated a particular charge. The purchase of RECs along with the electricity allows residents and entities to transfer the "renewable" aspects of renewable energy to renewable energy credits, paired with electricity from the grid, to allocate a particular amount of renewable energy being generated on your behalf.

In some embodiments, a system operating organization, referred to as the "ISO/RTO" (Independent System Operator/Regional Transmission Organization), may manage the power transmission network and an aggregator may manage the charge and discharge of the battery 224 of the electric vehicle 220 participating in V2G. For purposes of this example, the electric vehicle 220 is connected to the first transfer station 204a via a home energy management system (HEMS) 240. HEMS 240 refers to a system disposed in a general household or the like and manages electric energy in the household, and various electric appliances used in the household are connected via a communication line. In addition, each station may include a smart meter 206 and a charging stand 208, as well as a stationary battery 216. Each smart meter measures an amount of power usage each time a prescribed time period elapses (for example, each time thirty minutes elapse), stores the measured amount of power usage, and transmits the measured amount of power usage to server 290. For example, IEC (DLMS/COSEM) may be adopted as a protocol for communication between smart meters and server 290. The stationary battery 216 may store power, and may be charged with power and may discharge power. The power discharged from the stationary battery 216 may be used, for example, for charging of the electric vehicle 220 possessed by the user and for use at the user's home 242 or is provided to the power company.

Thus, the first transfer station 204a may for purposes of illustration be understood to be installed near a garage or the like of the user's home 242 (of a user that possesses the vehicle 220). By connecting a connector 212 at the tip of cable 272 extending from the charging stand 208 to an inlet 232 of the electric vehicle 220, the electric vehicle 220 is connected to the electric grid 260 of the power system via a power line, and is connected to the aggregator of the power system via a communication line. The aggregator refers to a device which manages the charge and discharge of batteries of multiple electric vehicles (not shown) including the electric vehicle 220, and is designed to respond to requests of the electric power company which operates the power plants and the system operating organization which manages the power transmission network by transmitting and receiving predetermined data and instructions to and from the electric vehicle 220.

Furthermore, in some embodiments, the electric vehicle 220 for purposes of this example may refer to a plug-in hybrid vehicle equipped battery 224. The vehicle may also include another drive source such as an engine; for example, an in-line four-cylinder gasoline engine. As one example, the battery 224 may be a lithium ion battery. In addition, the electric vehicle 220 is provided with a bidirectional charger 226 which converts power between an AC voltage and a DC voltage. Specifically, the bidirectional charger 226 converts the AC voltage from the power system to a DC voltage when the battery 224 is being charged, and converts the DC voltage from the battery 224 to an AC voltage when power is supplied to the power system by discharging the battery 224.

The electric vehicle 220 is also provided with an electronic control unit (ECU) 230 which controls various machines inside the electric vehicle 220. As shown in FIG. 2, the ECU 230 is connected to a digital communication unit (DCU) 228, which is capable of transmitting and receiving information about the battery 224 and the like to and from the server 290 and aggregator. In one example, the DCU 228 includes a communication interface (I/F) for communication with server 290, and a portable terminal such as a mobile computing device 218. DCU 228 may further include a communication I/F for communication with the HEMS.

In FIG. 2, When communication is established between the ECU 230 of the electric vehicle 220 and the server 290, in different embodiments, the ECU 230 is configured to transmit the following data as information about the battery: (a) state of charge (SOC), (b) battery output (charge/discharge) limit value—a chargeable limit power value at the time of charge and a dischargeable limit power value at the time of discharge; (c) state of charge limit value for the battery 224 during execution of a V2G event, and (d) charge completion time, which is usually set by the user of the electric vehicle 220 and is typically a time when the battery 224 should be fully charged. The ECU 230 may include a monitoring module that includes various sensors that detect a state (for example, a temperature, a current, and a voltage) of battery 224 and outputs a result of detection. ECU 230 may obtain a state (for example, a temperature, a current, a voltage, a state of charge (SOC), and an internal resistance) of battery 224 based on an output (that is, detection values from various sensors) from the monitoring module. The SOC represents a remaining amount of power storage, and it is expressed, for example, as a ratio of a current amount of stored power to an amount of stored power in a fully charged state that ranges from 0 to 100%.

In different embodiments, the electric vehicle 220 and/or first transfer station 204a are pre-registered with the server 290. When the electric vehicle 220 connects to the first transfer station 204a, a signal is automatically transmitted to server 290. The server 290 maintains a record for each registered vehicle in which an accounting of the source/amount of electricity stored in the vehicle's battery is identified. For purposes of this example, the electric vehicle 220 had recently been charged with energy from a clean energy source, such as a solar farm. Thus, the energy stored in battery 224 is clean. At the time of the charging of battery 224, the server 290 creates a transfer record identifying the source and amount of power, as well as other data (e.g., vehicle identifier, location, etc.).

In one embodiment, the server 290 works in conjunction with the energy regulatory authority (see FIG. 1) to verify whether the energy obtained should be associated with RECs or another such certification. In another embodiment, the charging event itself may present data that identifies and verifies the source of the energy. The data may be obtained directly from the electric vehicle 220 (via wireless unit 222) and/or from the transfer station location records. For example, the driver may have purchased RECs themselves with their most recent charge, or charged during a time that excess solar energy needed to be discharged from the grid 260. In another embodiment, the driver may have charged their vehicle using a friend's home's solar or wind energy (i.e., on-site renewables, including public charging stations that are directly connected to on-site renewable energy systems). These are simply examples; in other embodiments, the electric vehicle 220 may have been charged using a particular network of transfer stations that are part of a program that certifies all energy is sourced from renewable energy. In another example, the electric vehicle 220 was charged during off-peak hours when a renewable energy such as solar is abundant or at night when wind is often available. In still another example, the electric vehicle 220 may have enrolled in a program offered by utilities or even automakers that control the timing of electric vehicle charging to align with clean energy availability and grid needs.

In cases where some portion of the energy in the battery 224 was associated with a renewable source, a specific record is generated at the server 290. The server 290 will also track the electric vehicle 220 discharging events, for example via wireless data unit 222 of electric vehicle 220. Thus, if the electric vehicle 220 consumes the entirety of the charge, the renewable energy (or RECs) is deemed 'used' and may no longer be offered by the driver. However, if the electric vehicle 220 arrives at a destination (e.g., their home 242, an office building, the electric grid, etc.) with the SOC greater than zero, the driver may elect to discharge battery 224 via a transfer station. The discharge event may provide renewable energy directly to their home (for their own use), or more generally to the population via the grid 260. When this occurs, the amount of charge transferred is recorded by server 290 as a discharging event, and the identity (or location) of the recipient is noted. Thus, the clean energy has been "handed off" from the electric vehicle to the recipient in a manner similar to a relay, and the recipient is able to claim the energy they are using is clean based on the server records, which may be automatically shared with the energy regulatory authority.

In different embodiments, the driver may elect to receive compensation for the electricity transferred to the recipient. In addition, based on the server's records, the driver may also elect to receive compensation for the renewability attributes of the electricity transferred, which refers to a separate compensation component. The proposed systems are configured to determine when the energy transferred is clean energy based on the vehicle data and charging events. In one embodiment, once the server 290 determines the energy has been successfully transferred and was sourced renewable, it may couple the information received about both the discharging event and the energy's renewable origin and perform one or more actions including: (a) automatically issue a compensatory token—including money, points, vouchers, certificates, etc.—to the driver that reflect the clean source of the energy, (b) submit a request to the energy regulatory authority for RECs to be transferred to the recipient, (c) submit a request for compensation (e.g., invoice) to the recipient on the driver's behalf, (d) directly cause a transfer of REC's or other energy credits to the recipient account from the driver's account, (e) revoke the RECs if the recipient fails to pay the driver, (f) encourage (via various communication channels such as text, in-app messages, e-mails, etc.) drivers by alerting them to periods in which such energy transfers are particularly needed, and/or (g) maintain a record and/or track the flow of RECs to the driver from the renewable source, and then to a recipient from the driver. Typically, the recipient is already registered with the server 290 as well. In different embodiments, both driver and recipient will maintain accounts via the server 290 that enables transfer of money and/or credits between parties.

Figure 3:
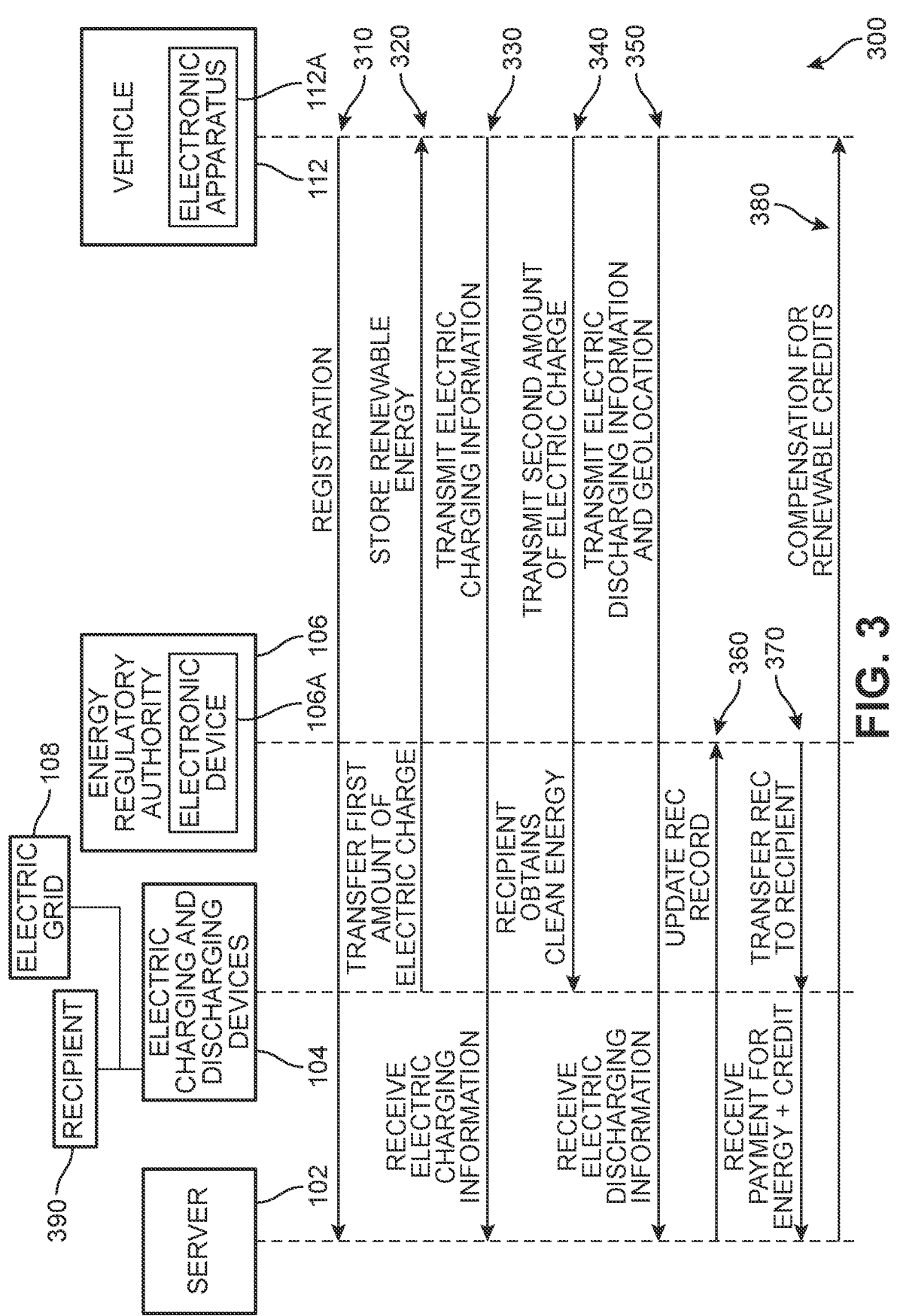
FIG. 3 is a sequence diagram that illustrates some operations for the credit management by the server, in accordance with an embodiment of the disclosure.

Referring now to FIG. 3, a sequence diagram that illustrates exemplary operations for credit management by the server 102 of FIG. 1 is depicted, in accordance with an embodiment of the disclosure. With reference to FIG. 3, there is shown a sequence diagram 300 of exemplary operations handled by the server 102 or the circuitry for the management of credits. In FIG. 3, the server 102 performs the exemplary operations from 310 to 380, which relates to management of the first credit information (such as the carbon credit information, or the tradable certificate).

At 310, registration of the vehicle 112 with the server 102 may occur. In an embodiment, the server 102 may also be configured to store the registration information related to the energy transfer devices 104. The registration information may be stored in the memory 204 of the server 102. The registration information may include, but not limited to, identification information (i.e., a unique identifier) for the vehicle, account information for the vehicle owner, communication information for enabling transmissions of data from/to the vehicle, a geo-location of each of the energy transfer devices 104, identification information (i.e., unique identifier) associated with each of the energy transfer devices (electric charging and/or discharging devices) 104, an electric charge cost for the energy transferred from the vehicle to the recipient, an electric charge cost for renewable credits transferred from the vehicle to the recipient, renewable programs in which the occupant/owner of the vehicle 112 has enrolled, etc.

At 320, the vehicle 112 initiates a charging event such that a first amount of electric charge is obtained via one of the energy transfer devices 104. This energy is stored in the battery of the vehicle 112. At 330, the charging information for the charging event is transmitted from vehicle 112 to the server 102. If the energy originated from a clean source or is otherwise certified as clean, the server 102 maintains a record of the certification for the energy.

For example, in different embodiments, the energy transfer devices 104 may also receive a Renewable Energy Certificate (REC) from the electric grid device 108A associated with the electric grid 108. In an embodiment, the energy transfer devices 104 may be configured to transmit the Renewable Energy Certificate (REC) as the electric charging information or as a part of the electric charging information to the server 102. In an embodiment, the circuitry 202 of the server 102 may be configured to receive the electric charging information from the energy transfer devices 104.

In some embodiments, when the energy transfer devices 104 charge the vehicle 112 or other electric vehicles, the energy transfer devices 104 may be configured to record the electric charging information. During the charging operation, the electric charging information (such as the charging data of the vehicle 112) may be generated or recorded. For example, the electric charging information may include, but not limited to, the renewable energy certificate (REC), the first amount of electric charge provided over the period of time (such as in a day, in a week, in a month, and the like), vehicle information (such as a registration number of the vehicle 112, a battery level at a time of charge of the vehicle 112), date-time information (such as a date and time when the vehicle 112 or other vehicle is charged), identification information (such as a license number, a registration number, or an identification number) associated with the corresponding electric charging facility device (such as one of the energy transfer devices 104), or location information (such as a geo-location or a postal address) associated with the corresponding electric charging facility device. In an embodiment, based on the received electric charging information, the server 102 may be configured to control operations of the energy transfer devices 104. In one embodiment, the server 102 may transfers the received electric charging information to the electronic device 106A associated with the energy regulatory authority 106.

At 340, the vehicle 112 arrives at another energy transfer device and elects to discharge a second amount of electric charge. In different embodiments, the second amount may be simply transferred to the grid 108 as part of a sustainable program between utilities and the public in which electric vehicle owners may sell back energy. In another example, the second amount may be transferred for direct use by a recipient for whom the transfer device is on-site and includes a stationary battery for use by a building or other private consumer.

Based on the transmission of the electric charging information, the energy regulatory authority 106 may be regularly updated about information that how much electric energy may be utilized or transferred to/from the vehicles via different energy transfer devices 104 of different geolocations (for example in a particular city, town, street, or state). Based on the transmitted electric charging information, the electronic device 106A may generate the first credit information, or the server 102 may be authorized and configured to do so.

At 350, the discharging event data (as well as the location of the vehicle 112) is transmitted to the server 102. In one example, the energy may be purchased according to terms between the vehicle owner and recipient. In some other embodiments, registration with the server 102 automatically enrolls the participants in a program for the exchange of energy and compensation. In another example, the server 102 may function only to manage compensation for renewable energy credits, rather than the actual electric charge. In some embodiments, the server 102 is configured to manage compensation between parties for both the electric charge delivered and the renewable energy credits associated with that charge.

At 360 the server 102 updates its internal database accordingly and may also generate a record for the energy regulatory authority 106 that certifies the energy delivered from the vehicle to the recipient is clean. At 370, RECs are provided to the recipient, either by the energy regulatory authority 106, or via the server 102. In one embodiment, the appropriate compensation is automatically debited from the recipient account, reflecting the amount of charge and the RECs that the charge was associated with. The compensation may be based on digital money, monetary points, or redeemable points, or other tokens of value. In some cases, the server 102 is configured to store funds for the recipient that will be used to compensate the owner of the electric vehicle and/or withdraw funds from a user account when renewable energy is purchased from an electric vehicle. Finally, at 370, the vehicle owner receives compensation for the power and credits that were transferred to the recipient.

Figure 4:
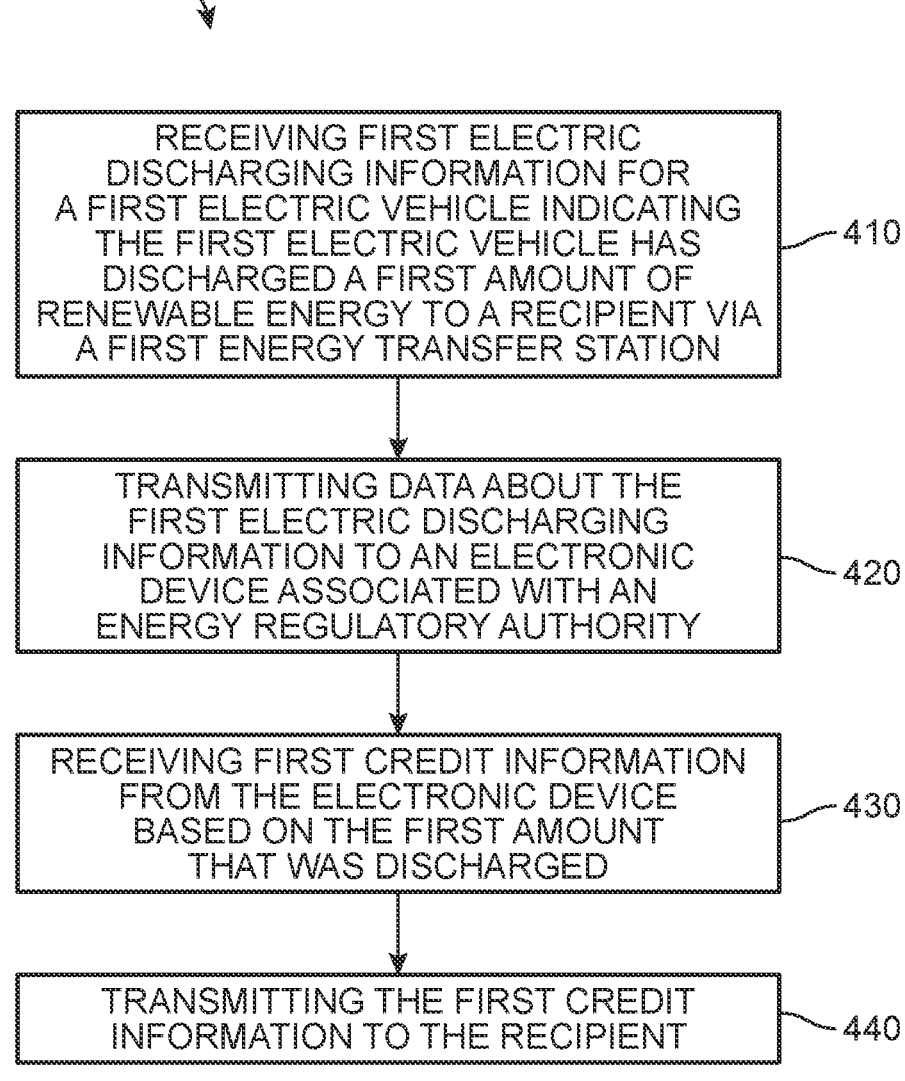
FIG. 4 is a flow chart depicting a method of managing the transfer of renewable energy credits (RECs), in accordance with an embodiment of the disclosure.

FIG. 4 is a flow chart illustrating an embodiment of a method 400 of managing the transfer of renewable energy credits (RECs). At 410, the method may include receiving, at a server, first electric discharging information for a first electric vehicle indicating the first electric vehicle has, at a first time, discharged a first amount of renewable energy to a recipient via a first energy transfer station. At 420, the method includes transmitting, from the server, data about the first electric discharging information to an electronic device associated with an energy regulatory authority. The method 400 also includes at 430, receiving, at the server, first credit information from the electronic device, the first credit information calculated based on the first amount that was discharged, and at 440, transmitting, from the server, the first credit information (to a computing device) for the recipient.

In different embodiments, the method 400 may include additional processes or aspects. In one example, the first credit information may be reflected in a record maintained on behalf of the recipient at the server that provides an accounting of their renewable energy purchases and/or consumption. In one embodiment, the method 400 also includes receiving, at the server, second electric charging information for the first electric vehicle indicating the first electric vehicle had, at a second time earlier than the first time, received a second amount of renewable energy. In such cases, the second amount will be greater than the first amount of renewable energy, as the vehicle will consume energy traveling to the destination of the first recipient. In some embodiments, the method 400 further includes processes of storing registration information for a first consumer, the registration information including a location of the first consumer, receiving geolocation data from the first electric vehicle around the first time, and determining an identity of the recipient corresponds to the first consumer based on the received geolocation data. In other words, because the electric vehicle was determined to be "at" the first consumer's location during the discharge, the recipient is automatically understood to be the first consumer. In other examples, the first energy transfer station may transmit its geolocation to the server for the same purpose. In one embodiment, the first energy transfer station is in communication with the server, and the unique identifier for the first energy transfer station establishes the identity of the recipient.

In some embodiments, the first energy transfer station is configured to supply energy directly to a building associated with the first consumer. For example, the first consumer may be a utility company, and the first energy transfer station is configured to return energy to an electric grid managed by the utility company. In such cases, the method 400 may also include automatically generating (at or by the server), a request for payment from the utility company to an account associated with the electric vehicle (e.g., an invoice).

In another example, the method 400 may include a process of automatically initiating, at the server, on behalf of the first consumer, a first payment amount to an account associated with the first electric vehicle for the attribute of renewability associated with the first amount of renewable energy. That is, the server may be configured to separately identify the compensation that should be paid to the electric vehicle owner for the transfer of RECs, and focus on the payment only for the credits. The first payment amount may be calculated based on the first credit information (provided by the energy regulatory authority). In some embodiments, the server is configured to automatically debit the first payment amount from an account for the first consumer and perform the transaction between the two parties. In one example, the method 400 includes a process of automatically initiating, at the server, on behalf of the first consumer, a second payment amount to the account associated with the first electric vehicle for the electricity provided by the first amount of renewable energy. In other words, the server may also be configured to identify the compensation that should be paid to the electric vehicle owner for the actual electricity transferred between the two parties, and perform a separate payment transaction for the energy. In some embodiments, the server is configured to automatically debit the first payment amount from an account for the first consumer and perform the transaction between the two parties.

Other methods may be contemplated within the scope of the present disclosure. For example, in some embodiments, a method of tracking a first amount of renewable energy is disclosed. The method includes receiving, at a server, first registration information for a first electric vehicle and generating a first account based on the first registration information, and receiving, at the server, second registration information for a first consumer and generating a second account based on the second registration information. The method further includes receiving, at the server, first electric discharging information for the first electric vehicle indicating the first electric vehicle has, at a first time, discharged a first amount of renewable energy to the first consumer, and determining, at the server, the first amount of renewable energy corresponds to a first number of renewable energy credits. The method includes transferring, from the first account to the second account, a first number of renewable energy credits.

In other embodiments, this method may include additional processes or aspects. In one example, the method also includes receiving, at the server, first electric charging information for the first electric vehicle indicating the first electric vehicle has, at a second time, obtained a second amount of renewable energy (e.g., from a sustainable energy provider/source), and automatically allocating a second number of renewable energy credits to the first account based on the second amount.

As a general matter, an embodiment of the server of FIG. 1 for credit management is described below, explained in conjunction with other elements from FIG. 1. As a general matter, the server may include circuitry, a memory, an I/O device, and a network interface. The circuitry may be coupled to the memory, the I/O device, and the network interface, through wired or wireless connections of the communication networks.

The circuitry may include suitable logic, circuitry, and/or interfaces that may be configured to execute program instructions associated with different operations to be executed by the server. For example, some of the operations may include, but are not limited to, reception of electric charging information from the transfer devices, transmission of the received electric charging information from each of the transfer devices to the electronic device associated with the energy regulatory authority, reception of the renewable credit information from the electronic device based on the transmitted electric charging information, and transmission of the first credit information to each of the transfer devices.

The circuitry may include any suitable special-purpose or general-purpose computer, computing entity, or processing device including various computer hardware or software modules and may be configured to execute instructions stored on any applicable computer-readable storage media (for example the memory). The circuitry may be implemented based on a number of processor technologies known in the art. For example, the circuitry may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. The circuitry may include any number of processors configured to, individually or collectively, perform any number of operations of the server, as described in the present disclosure. Examples of the circuitry may include a Central Processing Unit (CPU), a Graphical Processing Unit (GPU), an x86-based processor, an x64-based processor, a Reduced Instruction Set Computing (RISC) processor, a Complex Instruction Set Computing (CISC) processor, and/or other hardware processors.

The memory may include suitable logic, circuitry, interfaces, and/or code that may be configured to store the set of instructions executable by the circuitry. The memory may be configured to store the registration information for the transfer devices. The memory may be further configured to store the electric charging information, the renewable credit information, and the monetary information. Examples of implementation of the memory may include, but are not limited to, Random Access Memory (RAM), Read Only Memory (ROM), Hard Disk Drive (HDD), a Solid-State Drive (SSD), a CPU cache, and/or a Secure Digital (SD) card.

The I/O device may include suitable logic, circuitry, interfaces, and/or code that may be configured to receive user inputs and generate outputs in response to the received user inputs. The I/O device may receive the registration information associated with a new electric charging facility device as the user-input. For example, the server may receive the user-input from an executive of the organization associated with or handling the server for the credit management. The registration information may indicate a unique identifier or a location where the new electric charging facility device is positioned. The I/O device may include various input and output devices, may be configured to communicate with the circuitry. Examples of the I/O device may include, but are not limited to, a touch screen, a keyboard, a mouse, a joystick, a microphone, a display device, a speaker, and/or an image sensor.

The network interface may include suitable logic, circuitry, and interfaces that may be configured to facilitate communication between the circuitry, the electric charging facility devices, the electronic device of the energy regulatory authority, the electric grid device of the electric grid, the communication device of the renewable energy generation sources, and the electronic apparatus of the vehicle, via the communication network. The network interface may be implemented by use of various known technologies to support wired or wireless communication of the server with the communication network. The network interface may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging and a Short Message Service (SMS).

While the server in this case includes the circuitry, the memory, the I/O device, and the network interface, the disclosure should not be construed as limiting the server and may include more or less components to perform the same or other functions of the server. Details of the other functions and the components have been omitted from the disclosure for the sake of brevity. The functions or operations executed by the server may be performed by the circuitry. It should be understood that the server may be combined with the transfer devices to form a system. The transfer devices may be communicably coupled with the network Interface, via a communication network.

The following includes definitions of selected terms employed herein. The definitions include various examples and/or forms of components that fall within the scope of a term and that may be used for implementation. The examples are not intended to be limiting. Aspects of the present disclosure may be implemented using hardware, software, or a combination thereof and may be implemented in one or more computer systems or other processing systems. In one example variation, aspects described herein may be directed toward one or more computer systems capable of carrying out the functionality described herein. An example of such a computer system includes one or more processors. A "processor", as used herein, generally processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

The apparatus and methods described herein and illustrated in the accompanying drawings by various blocks, modules, components, circuits, steps, processes, algorithms, etc. (collectively referred to as "elements") may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented with a "processing system" that includes one or more processors. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

The processor may be connected to a communication infrastructure (e.g., a communications bus, cross-over bar, or network). Various software aspects are described in terms of this example computer system. After reading this description, it will become apparent to a person skilled in the relevant art(s) how to implement aspects described herein using other computer systems and/or architectures.

Computer system may include a display interface that forwards graphics, text, and other data from the communication infrastructure (or from a frame buffer) for display on a display unit. Display unit may include display, in one example. Computer system also includes a main memory, e.g., random access memory (RAM), and may also include a secondary memory. The secondary memory may include, e.g., a hard disk drive and/or a removable storage drive, representing a floppy disk drive, a magnetic tape drive, an optical disk drive, etc. The removable storage drive reads from and/or writes to a removable storage module in a well-known manner. Removable storage module, represents a floppy disk, magnetic tape, optical disk, etc., which is read by and written to removable storage drive. As will be appreciated, the removable storage module includes a computer usable storage medium having stored therein computer software and/or data.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals, which may be electronic, electromagnetic, optical or other signals capable of being received by communications interface. These signals are provided to communications interface via a communications path (e.g., channel). This path carries signals and may be implemented using wire or cable, fiber optics, a telephone line, a cellular link, a radio frequency (RF) link and/or other communications channels. The terms "computer program medium" and "computer usable medium" are used to refer generally to media such as a removable storage drive, a hard disk installed in a hard disk drive, and/or signals. These computer program products provide software to the computer system. Aspects described herein may be directed to such computer program products. Communications device may include communications interface.

Computer programs (also referred to as computer control logic) are stored in main memory and/or secondary memory. Computer programs may also be received via communications interface. Such computer programs, when executed, enable the computer system to perform various features in accordance with aspects described herein. In particular, the computer programs, when executed, enable the processor to perform such features. Accordingly, such computer programs represent controllers of the computer system.

In variations where aspects described herein are implemented using software, the software may be stored in a computer program product and loaded into computer system using removable storage drive, hard disk drive, or communications interface. The control logic (software), when executed by the processor, causes the processor to perform the functions in accordance with aspects described herein. In another variation, aspects are implemented primarily in hardware using, e.g., hardware components, such as application specific integrated circuits (ASICs). Implementation of the hardware state machine so as to perform the functions described herein will be apparent to persons skilled in the relevant art(s). In yet another example variation, aspects described herein are implemented using a combination of both hardware and software.

The foregoing disclosure of the preferred embodiments has been presented for purposes of illustration and description. It is not intended to be exhaustive or to limit the embodiments to the precise forms disclosed. Many variations and modifications of the embodiments described herein will be apparent to one of ordinary skill in the art in light of the above disclosure.

While various embodiments have been described, the description is intended to be exemplary, rather than limiting, and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

Further, in describing representative embodiments, the specification may have presented a method and/or process as a particular sequence of steps or processes. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art may readily appreciate that the sequences may be varied and still remain within the spirit and scope of the present embodiments.

The invention claimed is:

1. A method for tracking a first amount of renewable energy in a vehicle-to-everything (V2X) energy management system, the method comprising:

receiving, at a server, first registration information for a first electric vehicle and creating a first account based on the first registration information, the first registration information including a unique identifier for the first electric vehicle, a network address and communication information for enabling transmissions of data from an electronic control unit (ECU) of the first electric vehicle;

receiving, at the server, second registration information for a first consumer and creating a second account based on the second registration information, the second registration information including a location of the first consumer;

receiving, at the server via wireless transmission from the ECU of the first electric vehicle, first electric charging information indicating that the first electric vehicle has, at a first time, obtained a charge from a renewable energy source, the first electric charging information including a source identifier for the renewable energy source, and a first state of charge (SOC) value of a battery of the first electric vehicle after charging, and storing, at the server, a record for the first electric vehicle associating the renewable energy source with the charge, and the source identifier with the first SOC value;

automatically detecting, at the server, at a second time after the first time, initiation of a discharge event when the ECU of the first electric vehicle establishes a communication session and a signal is automatically transmitted to the server upon the first electric vehicle is connected to a first energy transfer station;

receiving, at the server via the communication session, a second SOC value from the ECU of the first electric vehicle at initiation of the discharge event and a third SOC value from the ECU at conclusion of the discharge event:

receiving, at the server from the ECU, geolocation data from the first electric vehicle during the discharge event;

automatically determining, by the server, that the geolocation data from the first electric vehicle correspond to the location of the first consumer, thereby identifying the first consumer as a recipient of the discharge event;

determining, at the server, a first amount of renewable energy discharged based on a difference between the second SOC value and the third SOC value;

automatically correlating, by the server, the first amount of renewable energy discharged with the stored record for the first electric vehicle associating the renewable energy source with the charge of the first SOC value, to verify the first amount of renewable energy was sourced from the renewable energy source;

determining, at the server, that the first amount of renewable energy corresponds to a first number of renewable energy credits (RECs) based on the verified sourcing; and automatically transferring, from the first account to the second account, the first number of renewable energy credits (RECs).

2. The method of claim 1, further comprising:

receiving, at the server, second electric charging information for the first electric vehicle indicating the first electric vehicle has, at a third time, obtained a charge from a second renewable energy source; and allocating a second number of renewable energy credits to the first account based on the second electric charging information.

3. The method of claim 1, further comprising:

automatically debiting, via the server, a first payment amount from the second account; and automatically crediting, via the server the first payment amount to the first account.

4. The method of claim 3, wherein the first payment amount corresponds to an electric charge cost for the first amount of renewable energy.

5. The method of claim 3, wherein the first payment amount corresponds to a cost associated with the first number of RECs.

6. The method of claim 1, wherein the first consumer is a utility company, and the first energy transfer station is configured to return energy to an electric grid managed by the utility company.

7. The method of claim 1, further comprising receiving, at the server, second electric charging information for the first electric vehicle indicating the first electric vehicle had, at a third time earlier than the first time, obtained a charge from a second renewable energy source.

8. The method of claim 1, further comprising:
   automatically generating, at the server, a record for an energy regulatory authority that certifies the first amount of renewable energy discharged from the first electric vehicle to the first consumer was sourced from the renewable energy source.

9. The method of claim 8, wherein the first consumer is a utility company, and the first energy transfer station is configured to return energy to an electric grid managed by the utility company.

10. The method of claim 9, further comprising automatically generating a request for payment from the utility company to an account associated with the first electric vehicle.

11. The method of claim 1, wherein the first energy transfer station is configured to supply energy directly to a building associated with the first consumer.

12. The method of claim 1, further comprising automatically initiating, at the server, on behalf of the first consumer, a first payment amount to an account associated with the first electric vehicle for an attribute of renewability associated with the first amount of renewable energy.

13. The method of claim 12, wherein the first payment amount is calculated based on the first number of RECs.

14. The method of claim 12, further comprising automatically initiating, at the server, and on behalf of the first consumer, a second payment amount to the account associated with the first electric vehicle for the electricity provided by the first amount of renewable energy.

15. The method of claim 1, further comprising, in response to the verified sourcing, automatically issuing, by the server, a compensatory token to an account associated with the first electric vehicle, the compensatory token reflecting the renewable energy source of the first amount of renewable energy discharged.

16. A system for tracking a first amount of renewable energy in a vehicle-to-everything (V2X) energy management system, the system comprising a processor and machine-readable media including instructions which, when executed by the processor, cause the processor to:
   receive, at a server, first registration information for a first electric vehicle and creating a first account based on the first registration information, the first registration information including a unique identifier for the first electric vehicle, a network address and communication information for enabling transmissions of data from an electronic control unit (ECU) of the first electric vehicle;
   receive, at the server, second registration information for a first consumer and creating a second account based on the second registration information, the second registration information including a location of the first consumer;
   receive, at the server via wireless transmission from the ECU of the first electric vehicle, first electric charging information indicating that the first electric vehicle has, at a first time, obtained a charge from a renewable energy source, the first electric charging information including a source identifier for the renewable energy source, and a first state of charge (SOC) value of a battery of the first electric vehicle after charging, and storing, at the server, a record for the first electric vehicle associating the renewable energy source with the charge, and the source identifier with the first SOC value;
   automatically detect, at the server, at a second time after the first time, initiation of a discharge event when the ECU of the first electric vehicle establishes a communication session and a signal is automatically transmitted to the server upon the first electric vehicle is connected to a first energy transfer station;
   receive, at the server via the communication session, a second SOC value from the ECU of the first electric vehicle at initiation of the discharge event and a third SOC value from the ECU at conclusion of the discharge event:
   receive, at the server from the ECU, geolocation data from the first electric vehicle during the discharge event;
   automatically determine, by the server, that the geolocation data from the first electric vehicle correspond to the location of the first consumer, thereby identifying the first consumer as a recipient of the discharge event;
   determine, at the server, a first amount of renewable energy discharged based on a difference between the second SOC value and the third SOC value;
   automatically correlate, by the server, the first amount of renewable energy discharged with the stored record for the first electric vehicle associating the renewable energy source with the charge of the first SOC value, to verify the first amount of renewable energy was sourced from the renewable energy source;
   determine, at the server, that the first amount of renewable energy corresponds to a first number of renewable energy credits (RECs) based on the verified sourcing; and
   automatically transfer, from the first account to the second account, the first number of renewable energy credits (RECs).

17. The system of claim 16, wherein the instructions further cause the processor to:
   receive, at the server, second electric charging information for the first electric vehicle indicating the first electric vehicle has, at a third time, obtained a charge from a second renewable energy source; and
   allocate a second number of renewable energy credits to the first account based on the second electric charging information.

18. The system of claim 16, wherein the instructions further cause the processor to:
   automatically debit, via the server, a first payment amount from the second account; and
   automatically credit, via the server the first payment amount to the first account.

19. The system of claim 18, wherein the first payment amount corresponds to an electric charge cost for the first amount of renewable energy.

20. The system of claim 18, wherein the first payment amount corresponds to a cost associated with the first number of RECs.

* * * * *